United States Patent
Brooks

(10) Patent No.: US 10,272,616 B1
(45) Date of Patent: Apr. 30, 2019

(54) METHOD AND APPARATUS FOR APPLYING LABELS TO CABLE

(71) Applicant: ENCORE WIRE CORPORATION, McKinney, TX (US)

(72) Inventor: Robert Eugene Brooks, Pomona, CA (US)

(73) Assignee: Encore Wire Corporation, McKinney, TX (US)

(*) Notice: Subject to any disclaimer, the term of this patent is extended or adjusted under 35 U.S.C. 154(b) by 294 days.

(21) Appl. No.: 15/204,646

(22) Filed: Jul. 7, 2016

Related U.S. Application Data

(60) Continuation of application No. 14/537,666, filed on Nov. 10, 2014, now Pat. No. 9,409,668, which is a division of application No. 13/162,557, filed on Jun. 16, 2011, now Pat. No. 8,905,108, which is a division of application No. 12/133,355, filed on Jun. 4, 2008, now abandoned.

(60) Provisional application No. 60/941,737, filed on Jun. 4, 2007, provisional application No. 60/970,510, filed on Sep. 6, 2007, provisional application No. 60/985,643, filed on Nov. 5, 2007, provisional application No. 60/985,978, filed on Nov. 6, 2007, provisional application No. 61/020,392, filed on Jan. 10, 2008.

(51) Int. Cl.
  *B32B 37/00* (2006.01)
  *B29C 65/00* (2006.01)
  *B29D 23/18* (2006.01)

(52) U.S. Cl.
  CPC ............ *B29C 65/002* (2013.01); *B29D 23/18* (2013.01)

(58) Field of Classification Search
  CPC ............ B29C 65/02; B29D 23/18; B65C 9/30; B65C 3/02; B65C 9/12; H01B 13/0003; H01B 13/0036
  USPC ........................................................ 156/538
  See application file for complete search history.

(56) References Cited

U.S. PATENT DOCUMENTS

| | | |
|---|---|---|
| 242,813 A | 6/1881 | Chinnock |
| 277,248 A | 5/1883 | Edgerton |
| 403,262 A | 5/1889 | Garland |
| 769,366 A | 9/1904 | Waterman |
| 817,057 A | 4/1906 | Greenfield |
| 840,766 A | 1/1907 | Greenfield |
| 951,147 A | 3/1910 | Porter |
| 1,068,553 A | 7/1913 | Abell |

(Continued)

FOREIGN PATENT DOCUMENTS

| | | |
|---|---|---|
| CH | 449732 | 1/1968 |
| CH | 590544 | 5/1977 |

(Continued)

OTHER PUBLICATIONS

AFC Cable Systems, "Installation Pocket Guide" (No date available).

(Continued)

*Primary Examiner* — James D Sells
(74) *Attorney, Agent, or Firm* — Warren Rhoades LLP

(57) ABSTRACT

A method for applying a label to an electrical cable having an outermost sheath with convolutions defining alternating peaks and valleys, the method including attaching the label to the sheath. The label includes a label substrate, the label substrate includes an attaching side, the attaching side being attached through an adhesive; and the label attaches to the peaks and spans across the valleys and circumferentially wraps around the sheath.

20 Claims, 17 Drawing Sheets

(56) References Cited

U.S. PATENT DOCUMENTS

| | | |
|---|---|---|
| 1,383,187 A | 6/1921 | Brinkman et al. |
| 1,596,215 A | 5/1923 | Palmer |
| 1,617,383 A | 12/1923 | Fazio |
| 1,580,760 A | 4/1926 | Palmer |
| 1,617,583 A | 2/1927 | Fentress et al. |
| 1,781,574 A | 11/1930 | Frederickson |
| 1,913,390 A | 6/1933 | Hungerford |
| 1,976,804 A | 10/1934 | Ringel |
| 1,995,407 A | 3/1935 | Walker |
| 2,118,630 A | 1/1936 | Waldron |
| 2,070,679 A | 2/1937 | Pebock et al. |
| 2,086,152 A | 7/1937 | Bedell |
| 2,106,048 A | 1/1938 | Candy, Jr. |
| 2,125,869 A | 8/1938 | Atkinson |
| 2,234,675 A | 3/1941 | Johnson |
| 2,316,293 A | 4/1943 | Scott |
| 2,372,868 A | 2/1944 | Warren, Jr. |
| 2,379,318 A | 6/1945 | Safford |
| 2,402,357 A | 6/1946 | Bates |
| 2,414,923 A | 1/1947 | Batcheller |
| 2,446,387 A | 8/1948 | Peterson |
| 2,464,124 A | 3/1949 | Duvall |
| 2,504,178 A | 4/1950 | Burnham et al. |
| 2,591,794 A | 4/1952 | Ebel |
| 2,628,998 A | 2/1953 | Frisbie |
| 2,629,953 A | 3/1953 | Von Stackelberg et al. |
| 2,663,754 A | 12/1953 | Bianco |
| 2,688,652 A | 9/1954 | Schumacher |
| 2,745,436 A | 5/1956 | Battle et al. |
| 2,816,200 A | 12/1957 | Mudge |
| 2,818,168 A | 12/1957 | Tobey et al. |
| 2,885,739 A | 5/1959 | Staller |
| 2,914,166 A | 11/1959 | Bihler |
| 2,944,337 A | 7/1960 | Coleman |
| 3,020,335 A | 2/1962 | Gillis |
| 3,073,944 A | 1/1963 | Yuter |
| 3,197,554 A | 7/1965 | Baker |
| 3,287,490 A | 11/1966 | Wright |
| 3,311,133 A | 3/1967 | Kinander |
| 3,328,514 A | 6/1967 | Cogelia |
| 3,434,456 A | 3/1969 | Geating |
| 3,459,233 A | 8/1969 | Webbe |
| 3,459,878 A | 8/1969 | Gressitt et al. |
| 3,474,559 A | 10/1969 | Hunt |
| 3,551,542 A | 12/1970 | Perrone |
| 3,551,586 A | 12/1970 | Dembiak |
| 3,636,234 A | 1/1972 | Wakefield |
| 3,650,059 A | 3/1972 | Johnson |
| 3,650,862 A | 3/1972 | Burr |
| 3,682,203 A | 8/1972 | Foti et al. |
| 3,720,747 A | 3/1973 | Anderson et al. |
| 3,748,372 A | 6/1973 | McMahon et al. |
| 3,790,697 A | 2/1974 | Buckingdam |
| 3,815,639 A | 6/1974 | Westerbarkey |
| 3,834,960 A | 9/1974 | Prentice et al. |
| 3,865,146 A | 2/1975 | Meserole |
| 3,913,623 A | 10/1975 | Siegwart |
| 3,938,558 A | 2/1976 | Anderson |
| 3,994,090 A | 11/1976 | Wheeler |
| 4,021,315 A | 5/1977 | Yanagida et al. |
| 4,028,902 A | 6/1977 | Courson et al. |
| 4,029,006 A | 6/1977 | Mercer |
| 4,029,129 A | 6/1977 | Harper |
| 4,109,099 A | 8/1978 | Dembiak et al. |
| 4,128,736 A | 12/1978 | Nutt et al. |
| 4,134,953 A | 1/1979 | Dembiak et al. |
| 4,139,936 A | 2/1979 | Abrams et al. |
| 4,141,385 A | 2/1979 | Siegwart |
| 4,154,976 A | 5/1979 | Brorein |
| 4,158,746 A | 6/1979 | Taylor et al. |
| 4,161,564 A | 7/1979 | Legbandt |
| 4,187,391 A | 2/1980 | Voser |
| 4,196,464 A | 4/1980 | Russell |
| 4,197,723 A | 4/1980 | Ehedy et al. |
| 4,197,728 A | 4/1980 | McGowen |
| 4,274,086 A | 6/1981 | Benckendorff et al. |
| 4,278,836 A | 7/1981 | Bingham |
| 4,280,225 A | 7/1981 | Willis |
| 4,284,842 A | 8/1981 | Arroyo et al. |
| 4,303,733 A | 12/1981 | Bulle et al. |
| 4,310,946 A | 1/1982 | Baker et al. |
| 4,319,940 A | 3/1982 | Arroyo et al. |
| 4,326,561 A | 4/1982 | Kutnyak |
| 4,328,394 A | 5/1982 | Aloisio, Jr. et al. |
| 4,329,561 A | 5/1982 | Schafer et al. |
| 4,340,773 A | 7/1982 | Perreault |
| 4,360,704 A | 11/1982 | Madry |
| 4,368,613 A | 1/1983 | Sanchez |
| 4,376,229 A | 3/1983 | Maul et al. |
| 4,406,914 A | 9/1983 | Kincaid |
| 4,423,306 A | 12/1983 | Fox |
| 4,424,627 A | 1/1984 | Tarbox |
| 4,465,717 A | 8/1984 | Crofts et al. |
| 4,477,298 A | 10/1984 | Bohannon, Jr. et al. |
| 4,499,010 A | 2/1985 | Tanio et al. |
| 4,528,420 A | 7/1985 | Kish et al. |
| 4,543,448 A | 9/1985 | Deurloo |
| 4,547,626 A | 10/1985 | Pedersen et al. |
| 4,549,755 A | 10/1985 | Kot et al. |
| 4,552,989 A | 11/1985 | Sass |
| 4,579,759 A | 4/1986 | Breuers |
| 4,584,238 A | 4/1986 | Gen et al. |
| 4,595,431 A | 6/1986 | Bohannon, Jr. et al. |
| 4,629,285 A | 12/1986 | Carter et al. |
| 4,636,271 A | 1/1987 | Gandolfo |
| 4,644,092 A | 2/1987 | Gentry |
| 4,701,575 A | 10/1987 | Gupta et al. |
| 4,719,320 A | 1/1988 | Strait, Jr. |
| 4,731,502 A | 3/1988 | Finamore |
| 4,746,767 A | 5/1988 | Gruhn |
| 4,749,823 A | 6/1988 | Ziemek et al. |
| 4,761,519 A | 8/1988 | Olson et al. |
| 4,770,729 A | 9/1988 | Spencer et al. |
| 4,778,543 A | 10/1988 | Pan |
| 4,868,023 A | 9/1989 | Ryan et al. |
| 4,880,484 A | 11/1989 | Obermeier et al. |
| 4,947,568 A | 8/1990 | De Barbieri |
| 4,956,523 A | 9/1990 | Pawluk |
| 4,963,222 A | 10/1990 | Bonjour et al. |
| 4,965,412 A | 10/1990 | Lai et al. |
| 4,970,352 A | 11/1990 | Satoh |
| 4,997,994 A | 3/1991 | Andrews et al. |
| 5,001,303 A | 3/1991 | Coleman et al. |
| 5,038,001 A | 8/1991 | Koegel et al. |
| 5,049,721 A | 9/1991 | Parnas et al. |
| 5,061,823 A | 10/1991 | Carroll |
| 5,078,613 A | 1/1992 | Salmon |
| 5,103,067 A | 4/1992 | Aldissi |
| 5,171,635 A | 12/1992 | Randa |
| 5,180,884 A | 1/1993 | Aldissi |
| 5,189,719 A | 2/1993 | Coleman et al. |
| 5,216,202 A | 6/1993 | Yoshida et al. |
| 5,250,885 A | 10/1993 | Kabeya |
| 5,289,767 A | 3/1994 | Montalto et al. |
| 5,350,885 A | 9/1994 | Falciglia et al. |
| 5,408,049 A | 4/1995 | Gale et al. |
| 5,444,466 A | 8/1995 | Smyczek et al. |
| 5,468,914 A | 11/1995 | Falciglia et al. |
| 5,468,918 A | 11/1995 | Kanno et al. |
| 5,470,253 A | 11/1995 | Siems et al. |
| 5,504,540 A | 4/1996 | Shatas |
| 5,527,995 A | 6/1996 | Lasky |
| 5,557,071 A | 9/1996 | Falciglia et al. |
| 5,651,081 A | 6/1997 | Blew et al. |
| 5,703,983 A | 12/1997 | Beasley, Jr. |
| 5,708,235 A | 1/1998 | Falciglia et al. |
| 5,719,353 A | 2/1998 | Carlson et al. |
| 5,775,935 A | 7/1998 | Barna |
| 5,777,271 A | 7/1998 | Carlson et al. |
| 5,862,774 A | 1/1999 | Moss |
| 5,887,368 A | 3/1999 | Rupp |
| 6,017,627 A | 1/2000 | Iwata et al. |
| 6,113,996 A | 9/2000 | Amon et al. |
| 6,311,637 B1 | 11/2001 | Moss |

(56) References Cited

U.S. PATENT DOCUMENTS

| | | |
|---|---|---|
| 6,486,395 B1 | 11/2002 | Temblador |
| 6,562,454 B2 | 5/2003 | Takahashi et al. |
| 6,651,362 B2 | 11/2003 | Caveney |
| RE38,345 E | 12/2003 | Falciglia et al. |
| 6,825,418 B1 | 11/2004 | Dollins et al. |
| 6,906,264 B1 | 6/2005 | Grant, Jr. et al. |
| 6,908,418 B2 | 6/2005 | Saure |
| 7,178,572 B2 | 2/2007 | Schanke et al. |
| 7,465,878 B2 | 12/2008 | Dollins et al. |
| 7,812,259 B2 | 10/2010 | Agan et al. |
| 7,954,530 B1 | 6/2011 | Bennett et al. |
| 8,347,533 B2 | 1/2013 | Hardin et al. |
| 8,540,836 B1 | 9/2013 | Hardin et al. |
| 8,708,018 B2 | 8/2014 | Boulay et al. |
| 2004/0098889 A1 | 5/2004 | Proctor |
| 2009/0001707 A1 | 1/2009 | Brooks |
| 2009/0095398 A1 | 4/2009 | Hardin et al. |

FOREIGN PATENT DOCUMENTS

| | | |
|---|---|---|
| DE | 328905 | 11/1920 |
| DE | 751575 | 10/1951 |
| DE | 1902057 | 10/1964 |
| DE | 4016445 | 8/1991 |
| EP | 0318841 | 6/1989 |
| FR | 763504 | 5/1934 |
| GB | 189908045 | 4/1899 |
| GB | 191511072 | 1/1916 |
| GB | 194419 | 3/1923 |
| GB | 212602 | 8/1923 |
| GB | 275250 | 9/1927 |
| GB | 332303 | 7/1930 |
| GB | 478891 | 5/1937 |
| GB | 629923 | 12/1948 |
| GB | 691843 | 5/1953 |
| GB | 905981 | 9/1962 |
| GB | 913514 | 12/1962 |
| GB | 1073340 | 6/1967 |
| GB | 1117862 | 6/1968 |
| GB | 1432548 | 4/1976 |
| GB | 1490439 | 11/1977 |
| GB | 2154785 | 9/1985 |
| GB | 2314547 | 1/1998 |
| JP | 49-020780 | 2/1974 |
| JP | 52-023677 | 2/1977 |
| JP | 52-121679 | 10/1977 |
| JP | 55-120031 | 9/1980 |
| JP | 57-143379 | 9/1982 |
| JP | 59-087194 | 5/1984 |
| JP | 60-097179 | 5/1985 |
| JP | 62-037186 | 2/1987 |
| JP | 64-081113 | 3/1989 |
| JP | 1-134808 | 5/1989 |
| JP | 3-025806 | 2/1991 |
| JP | 3-173015 | 7/1991 |
| JP | 4-163048 | 6/1992 |
| JP | 4-312850 | 11/1992 |
| NL | 65-10231 | 2/1966 |
| WO | 8801247 | 2/1988 |

OTHER PUBLICATIONS

Hamad et al., "United States Statutory Invention Registration No. H631", May 2, 1989.

Heinhold, Lothar, "Power Cables and their Application", Part 1:3rd revised edition 1990; ISBN-3-8009-1535-9; Section 14, pp. 124-133.

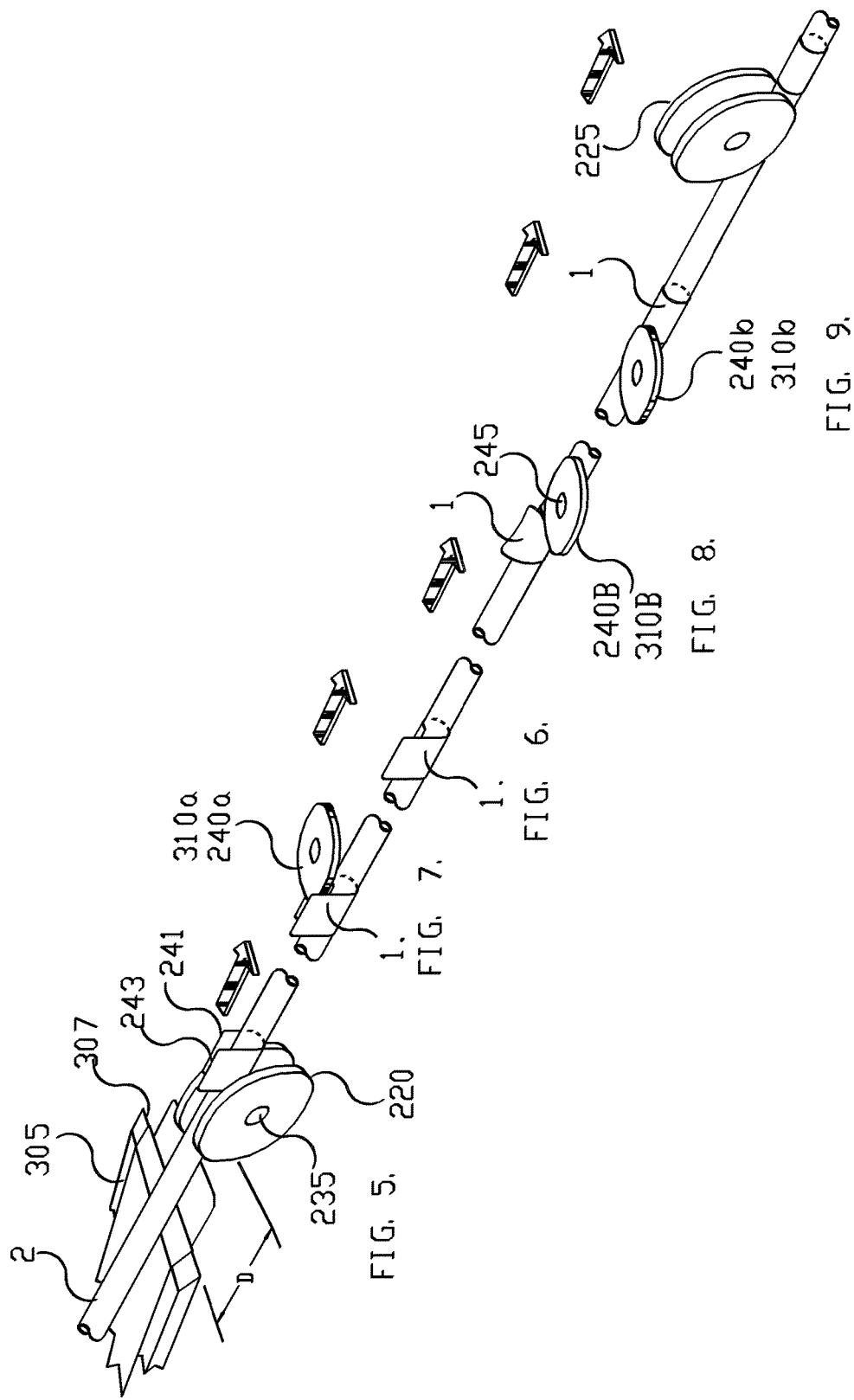

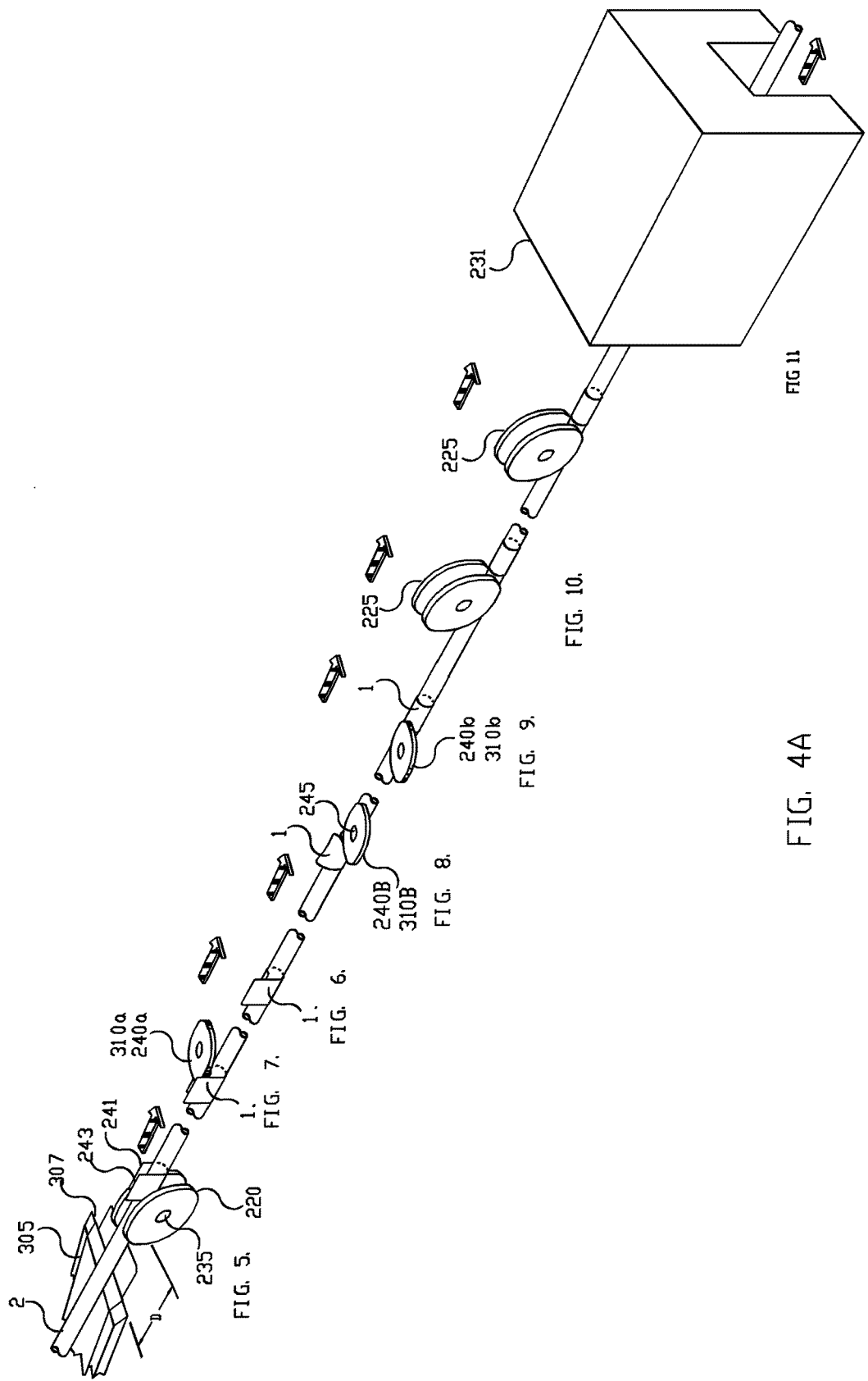

DIRECTION OF CABLE TRAVEL

METHOD AND APPARATUS FOR APPLYING LABELS TO CABLE

CROSS-REFERENCE TO RELATED APPLICATIONS

This application is a continuation of U.S. patent application Ser. No. 14/537,666, filed Nov. 10, 2014, now issued as U.S. Pat. No. 9,409,668, issued on Aug. 9, 2016, which is a divisional of U.S. patent application Ser. No. 13/162,557, filed Jun. 16, 2011, now granted as U.S. Pat. No. 8,905,108, on Dec. 9, 2014, which claims priority from U.S. patent application Ser. No. 12/133,355, filed Jun. 4, 2008, now abandoned, which claims priority from U.S. Provisional Application Ser. No. 60/941,737, filed on Jun. 4, 2007; U.S. Provisional Application Ser. No. 60/970,510, filed Sep. 6, 2007; U.S. Provisional Application Ser. No. 60/985,643, filed on Nov. 5, 2007; U.S. Provisional Application Ser. No. 60/985,978, filed on Nov. 6, 2007; and from U.S. Provisional Application Ser. No. 61/020,392 filed on Jan. 10, 2008. The disclosures of the above applications are hereby incorporated by reference in the respective entirety of each.

BACKGROUND OF THE INVENTION

1. Field of the Invention

The present invention relates to a labeled cables and methods and apparatuses for affixing labels to cables, and more particularly, methods, and apparatuses for affixing labels to moving cables.

2. Description of the Related Art

A cable or conduit generally consists of one or more internal conductors and a sheath that envelopes internal conductors. Labels are then applied to the sheath of the cable or conduit to identify characteristics of the cable or conduit, for example, the type and size of the cable or conduit. In the current state of the art, various methods are used to apply specific colors to cable or conduit and/or conduit. One method is to apply an ink directly to an outer sheath of the cable or conduit by spraying, wiping, dripping, brushing, etc. However, colors applied by this method may not be easily removed and the method in which the ink is applied may not be easily managed as liquid or powder is used. Therefore, a need exists for an apparatus and a method for applying informative labels to cable or conduit and/or conduit without the disadvantages of the existing methods.

BRIEF SUMMARY OF THE INVENTION

One disclosed embodiment of the invention provides a labeled cable comprising an outer surface having corrugations comprising alternating ridges and grooves disposed on the outer surface; and a label having a label body, the label body having an attaching side having an adhesive disposed thereon, the attaching side attachable to the ridges and spanning across the grooves.

In still another disclosed embodiment of the invention an apparatus is configured for affixing a label to a cable moving in a direction parallel to the cable's axis. The label has front and back sides and a perimeter. The apparatus is configured to affix the label to the cable in a manner in which the label wraps completely around a perimeter of the cable. The apparatus includes a bottom push up roller having a channel configured to receive a moving cable; a first roll down roller downstream of the top push up roller disposed lateral to the moving cable and configured to fold down a side of a label onto the cable; a second roll down roller downstream of the first roll down roller disposed lateral to the moving cable on a side opposite to the first roll down roller and configured to fold down a side of a label onto the cable; and a top push down roller having a channel configured to receive a moving cable.

In still another disclosed embodiment of the invention the apparatus is configured to affix the label to the cable in a manner in which the back side of the label is partially flush with an outer surface of the cable, the label body has a thickness of about 1.5 mil to 2.0 mil for maintaining the stiffness of the label body across the grooves, and the label is formed from polyolefin.

In still another disclosed embodiment of the invention the apparatus is configured to affix an electrically conductive label with electrically conductive adhesive on the attaching side to the cable in which the label includes a human readable side containing human recognizable indicia such as alpha numeric characters.

The following description and drawings set forth in detail a number of illustrative embodiments of the invention. These embodiments are indicative of but a few of the various ways in which the present invention may be utilized. The summary is not intended to limit the scope of the invention, which is defined solely by the claims attached hereto.

BRIEF DESCRIPTION OF THE DRAWINGS

A more complete appreciation of the invention is provided by reference to the following detailed description of the appended drawings and figures. The following descriptions, in conjunction with the appended figures, enable a person having skill in the art to recognize the numerous advantages and features of the invention by understanding the various disclosed embodiments. These drawings are provided to facilitate the reader's understanding of the invention and shall not be considered limiting of the breadth, scope, or applicability of the invention. It should be noted that for clarity and ease of illustration these drawings are not necessarily made to scale. The following figures are utilized to best illustrate these features.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

FIG. 4 is a diagram of a perspective overview of one disclosed method of operation of the components of an apparatus for affixing labels to a moving cable in accordance with one embodiment of the invention;

FIG. 4A is a diagram of a perspective overview of one disclosed method of operation of the components of an apparatus for affixing labels to a moving cable in accordance with one embodiment of the invention;

FIG. 12A is a diagram of a front view of a bottom push up roller in operation in accordance with one embodiment of the invention;

FIG. 12B is a diagram of a front view of first and second roll down rollers in operation in accordance with one embodiment of the invention;

FIG. 12C is a diagram of a front view of a member for pushing a label to one side in operation in accordance with one embodiment of the invention;

FIG. 12D is a diagram of a front view of a top push down roller in operation in accordance with one embodiment of the invention;

FIG. 12E is a diagram of a cross sectional view of a label with sides positioned upward with disparate heights in accordance with one embodiment of the invention;

FIG. 12F is a diagram of a cross sectional view of a tamp pad in an initial stage of operation in accordance with one embodiment of the invention;

FIG. 12G is a diagram of a cross sectional view of a tamp pad in a subsequent stage of operation in accordance with one embodiment of the invention;

FIG. 13A is a diagram of a tamp pad in accordance with one embodiment of the invention;

FIG. 13B is a diagram of labels moving onto the tamp pad perpendicular to the direction of motion of the cable in accordance with one embodiment of the invention;

FIG. 13C is a diagram of a tamp pad with a label disposed thereon moving upward toward a moving a cable in accordance with one embodiment of the invention;

FIG. 13D is a diagram of a tamp pad attaching a label to a moving cable in accordance with one embodiment of the invention;

FIG. 13E is a diagram of a label after it is attached to the cable by the tamp pad in accordance with one embodiment of the invention;

FIG. 13F is a diagram of a bottom push up roller in operation in accordance with one embodiment of the invention;

FIG. 13G is a diagram of a first roll down roller in operation in accordance with one embodiment of the invention;

FIG. 13G1 is a diagram of one disclosed embodiment for rolling down a label to a moving cable;

FIG. 13H is a diagram of a label after being operated on by the first roll down roller in accordance with one embodiment of the invention;

FIG. 13I is a diagram of a second roll down roller in operation in accordance with one embodiment of the invention;

FIG. 13J is a diagram of a second roll down roller in a later stage of operation in accordance with one embodiment of the invention;

FIG. 13K is a diagram of a top push down roller in operation in accordance with one embodiment of the invention;

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE INVENTION

From time-to-time, the present invention is described herein in terms of these example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

The following discussion is presented to enable a person skilled in the art to make and use the invention. The general principles described herein may be applied to embodiments and applications other than those detailed below without departing from the spirit and scope of the present invention as defined by the appended claims. The present invention is not intended to be limited to the embodiments shown, but is to be accorded the widest scope consistent with the principles and features disclosed herein.

The invention is directed toward a labeled cable and an apparatus for affixing a label to a moving cable, and more particularly some embodiments are directed to a labeled corrugated cable and apparatuses and methods of applying a label to the cable.

Figure 1:
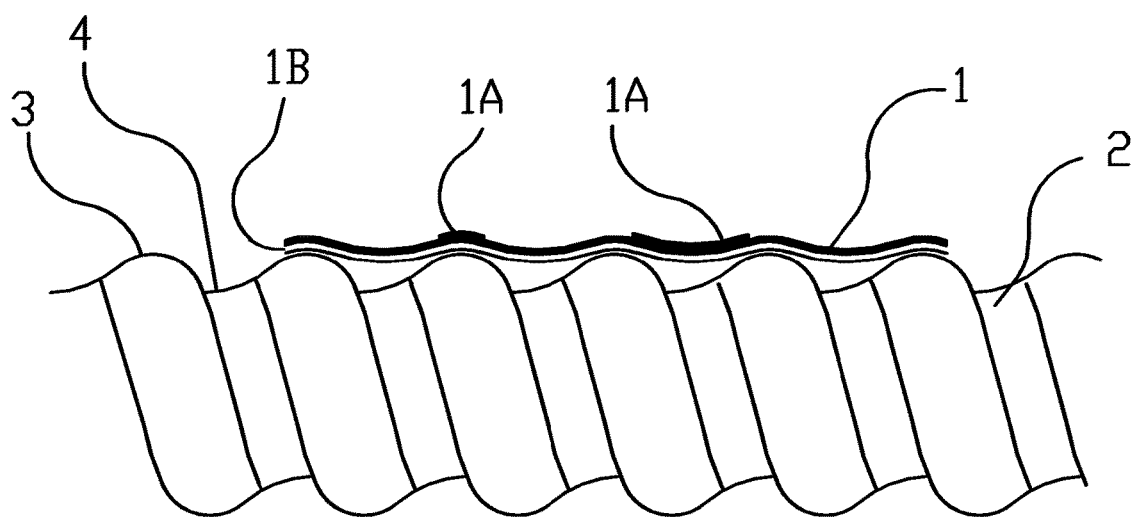
FIG. 1 is a diagram of an exemplary cable or conduit in accordance with one embodiment of the invention.

Referring now to FIG. 1, an exemplary cable or conduit in accordance with one embodiment of the invention is disclosed. A smooth, attachable, printable label 1 is affixed to the sheath of a corrugated cable 2. The label has a label body 1A or substrate that bridges across the grooves 4 adjacent to and alternating between the ridges 3 of the sheath of the cable. The body of the label 1A may wrap around the cable less than or equal to 360 degrees. In another disclosed embodiment, the body of the label 1A may wrap around the cable more than 360 degrees for retention to the cable 2. The label body 1A may have an adhesive on the side of the label 1 that attaches to the cable 2 and may be of a thickness that prevents the label 1 from dipping down into the grooves 4 of the cable 2 when it is attached to the cable 2. In another disclosed embodiment, the label 1 attaches to the cable 2 by dipping down into the grooves 4 of the cable 2 and at least partially conforming to the ridges 3 and grooves 4 of the cable 2. The adhesion of the label 1 to the ridges 3 permits the label 1 to conform to the circumference of the sheath and stay attached to the ridges 3 of the cable 2. In one disclosed embodiment, the thickness of the label is between 1.5 to 2.0 mil. When the body of the label 1A is wrapped around the cable more than 360 degrees, it will overlap itself and adhere to part of itself, which provides more adherence and longevity of its life and purpose which, in one embodiment, is to display information regarding the cable, however any type of information may be displayed. The body of the label 1A after it is attached to the sheath of the cable 2, provides a continuous surface with a relatively flat configuration that may serve as a canvass to paint on or print on. In another disclosed embodiment, the label body 1A may be emblazoned with human and/or machine readable data. The human and/or machine readable data includes alpha numeric characters which may display manufacturer specific information, cable specifications, warnings, advertisement, or job-site designations. The purpose of the alpha numeric characters includes identifying the number of conductors, type of insulation, type of cable, type of application, or anything at all including but not limited to the wire gauge. Further, as is disclosed in FIG. 2, the electrical characteristics of the cable 2, the 120 V indicia on the label body 1A, may be provided.

In one embodiment, the label 1 may be comprised of electrically conductive material such as electrically conductive polyofelin and may include an electrically nonconductive adhesive.

Figure 2:
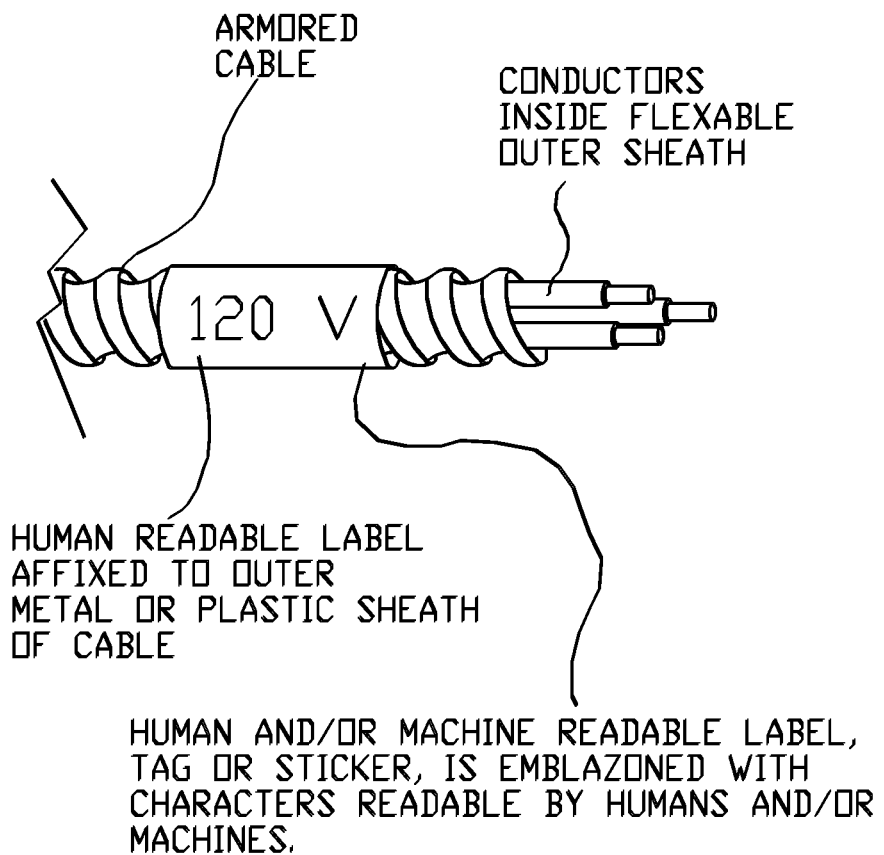
FIG. 2 is a diagram of a perspective view of a labeled cable in accordance with one embodiment of the invention.

Referring to FIG. 2, a diagram of a perspective view of a labeled cable in accordance with one embodiment of the invention is disclosed. To indicate that the cable 2 is of the particular type, a label 1 is affixed around the circumference of the outer surface of the sheath of the cable 2. In one disclosed embodiment, the label 1 has writing 1B on it to coincide with the insulations and to indicate the type of the conductor inside the MC or AC cable, thus relieving the person looking for information pertinent to the cable 2 from having to have knowledge in deciphering a code for cables, that may for example include colors, dots, dashes, stripes, bands, solid colors, and any other patterns and indicia requiring a particular knowledge, for cables, in order to quickly obtain information regarding the cable 2.

In one disclosed implementation of the invention shown in FIG. 2, an MC or AC type 277-volt flexible armored cable 2 includes several internal conductors and a readable label 1 affixed and displayed on the outer surface of the sheath that is emblazoned with letters of any alphabet 1B. In this implementation, there is no need to print information on the cable 2 itself, as the label 1 provides the substrate for printing. Persons who install or maintain a labeled cable in accordance with a disclosed embodiment of the invention, may quickly and instantly read the label 1 to identify the conductors in the particular type of cable 2, such as their gauge, voltage rating, etc., even though they may not be able to see the insulation on the internal wires. They may also recognize the cable 2 as being of type MC or AC based on the writing on the label 1. Knowing the type or function of a given cable 2 without seeing the insulations on the internal wires, and without having to memorize a code, can save time and reduce hazards.

A sequence of labels can be repeated all along the length of the cable. In one disclosed embodiment, labels 1 may be placed on successive sections of a steel or metal cable 2 as it is dispensed from a feed roll and just before the strip enters a forming machine where it is convoluted.

In the case of a labeling machine that applies the label to a moving steel strip just before it enters the forming (convoluting) machine, the labeling machine must be able to switch labels quickly and to apply and cure or shrink the label in a short time between when the strip arrives at the labeling machine and when it is delivered into the forming machine.

The labels 1 may be a tag or sticker, for identifying a continuous processed cable, wire, conductor, hose, tube, rod, belt, cord of round, oval, rectangular or other cross sectional shape, that is attached to the outside surface at certain intervals and are emblazoned with human and/or machine readable markings or indicia.

In one disclosed embodiment, the label body 1A may be composed of polyolefin and have a thickness from 1.5 mil to 2.0 mil. However, the label body 1A may be any other shrinkable or non-shrinkable material, or polyester or other plastic or elastomer or paper or a thin, film type metal or natural, organic or inorganic substance or material that will conform to the shape of the cable, wire, conductor, hose, tube, rod, belt, cord of any cross sectional shape.

Figure 2A:
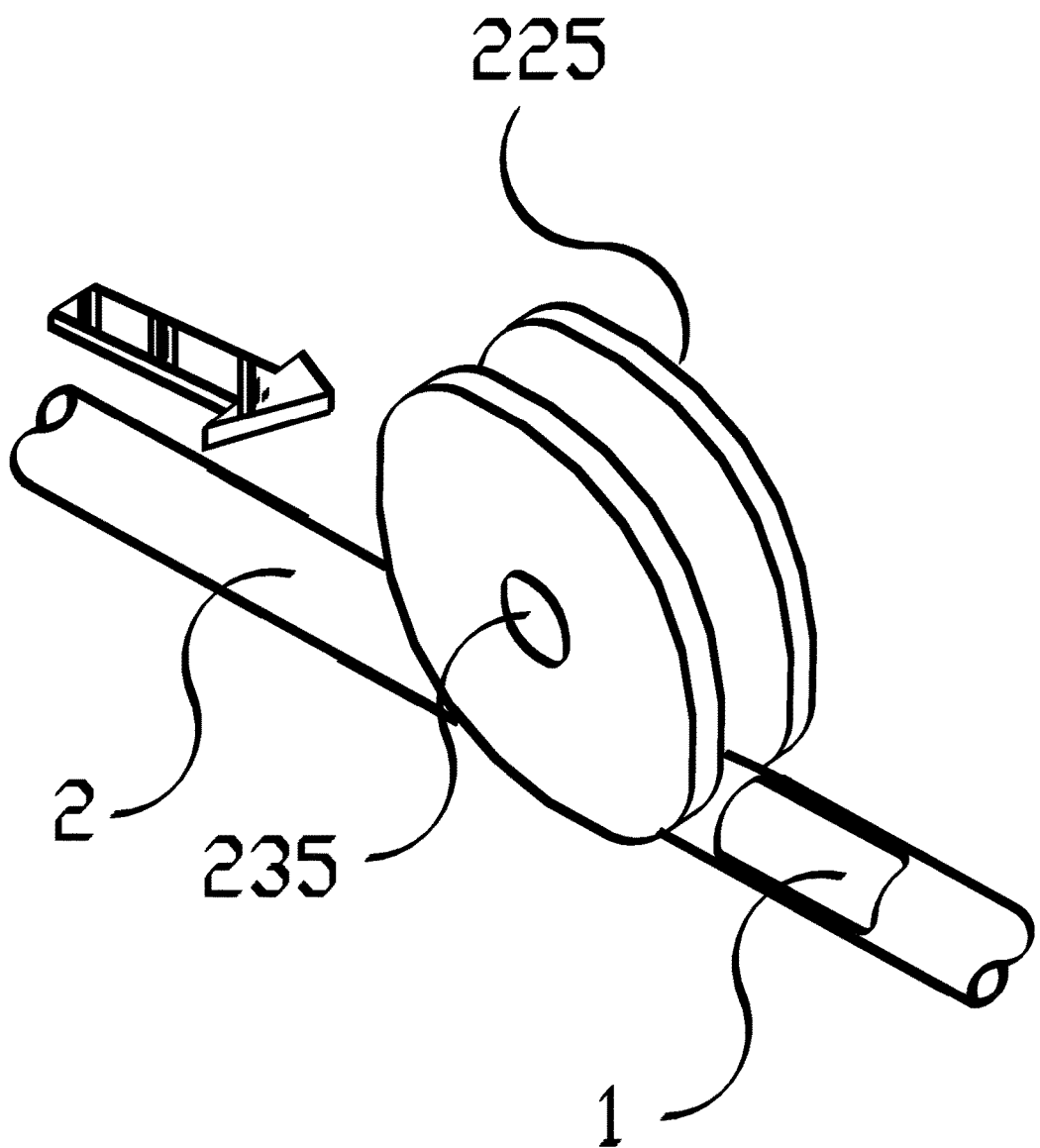
FIG. 2A is a diagram of a roller forming part of an apparatus for affixing labels to a moving cable in accordance with one embodiment of the invention.

Referring now to FIG. 2A, a diagram of a roller 225 forming part of an apparatus for affixing labels to a moving cable in accordance with one embodiment of the invention is disclosed. In another disclosed embodiment, the label body may wrap around the cable less than 360 degrees around the outer surface of a continuous processed, cable, wire, conductor, hose, tube, rod, belt, cord of any cross sectional shape.

In a further embodiment, the label 1 does not attach continuously along the length of said cable, wire, conductor, hose, tube, rod, belt, or cord 2 of a particular cross sectional shape but is attached at certain, repeated, determinable intervals and thus requires the tag or label 1, to be of certain length along the cable, wire, conductor, hose, tube, rod, belt, or cord 2 of said cross sectional shape.

In one disclosed implementation, affixing a label 1 to a cable 2 is achieved by attaching the label 1 onto the cable 2 after the cable has been helically wrapped with metal sheathing such as with armored cable or metal-clad cable.

Figure 2B:
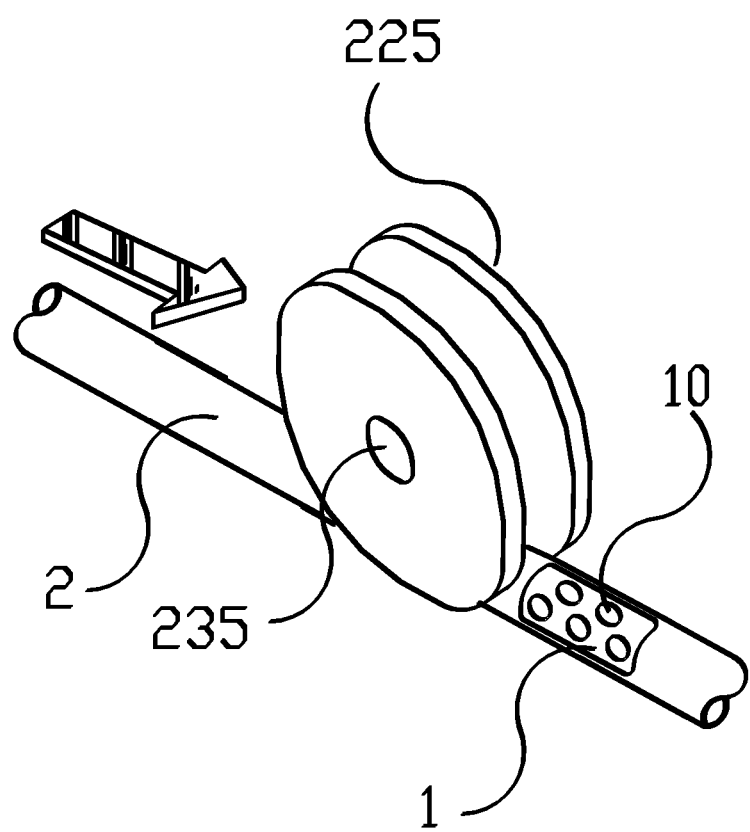
FIG. 2B is a diagram of a roller and a label with holes disposed thereon attached to the cable in accordance with one embodiment of the invention.

Referring to FIG. 2B, a diagram of a roller and a label with holes disposed thereon attached to the cable in accordance with one embodiment of the invention is disclosed. In this disclosed embodiment, the label 1 has holes 10, or perforations, disposed throughout label 1 that penetrate completely through the label 1. When the label 1 is placed on the cable 2, the holes 10 serve to prevent the label 2 from impeding the flow of electrical current. For example, if the cable 2 is feeding into an electrical junction box, it is often desirable to ground the cable 2 via electrical contact with the junction box. If the point of contact between the cable and the junction box happens to line up with a labeled portion of the cable 2, the holes 10 allow for electrical contact between the labeled portion of the cable 2 and the junction box.

Figure 3:
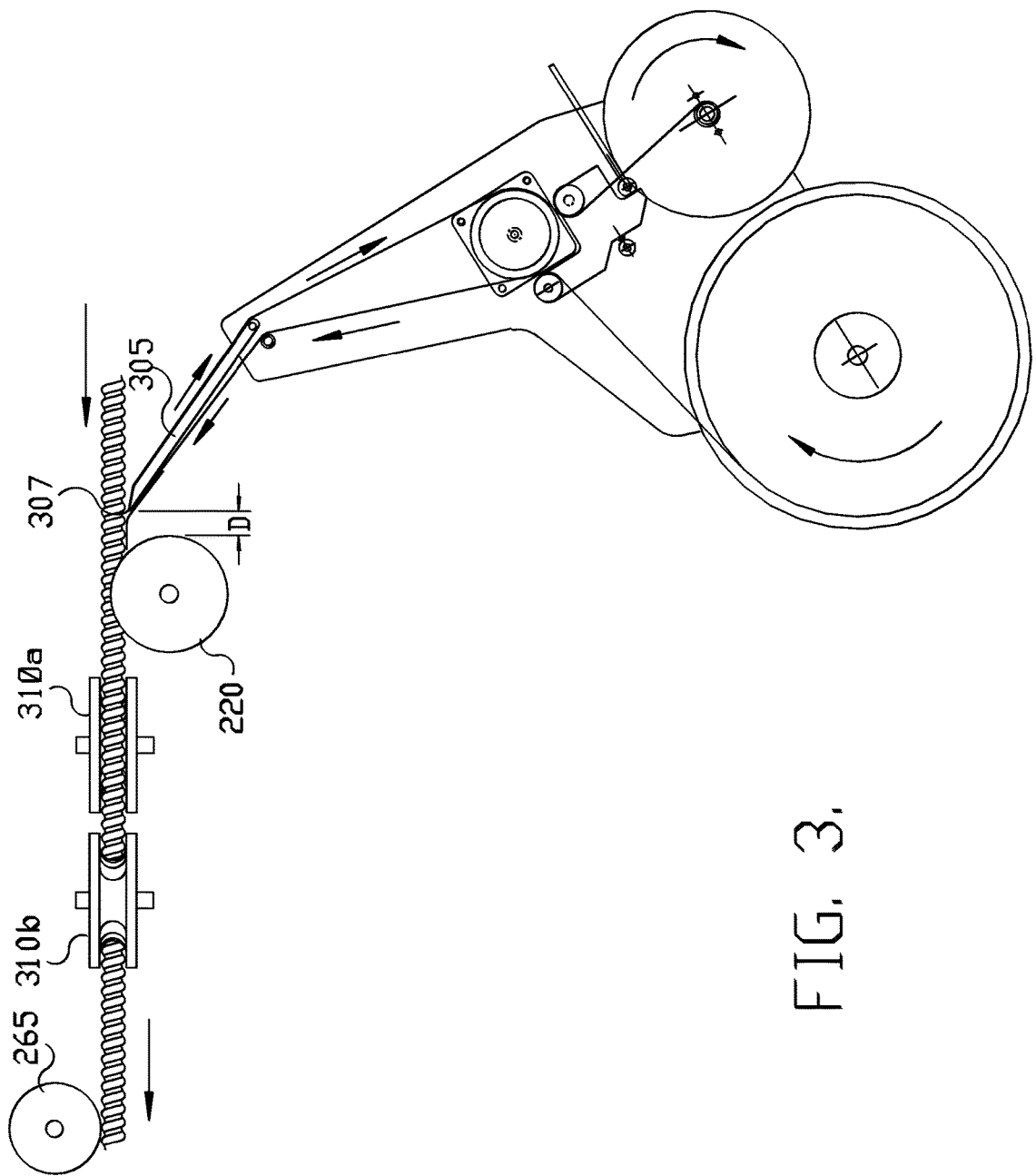
FIG. 3 is a diagram of a partial side view of an apparatus for affixing labels to a moving cable in accordance with one embodiment of the invention.
Figure 5:
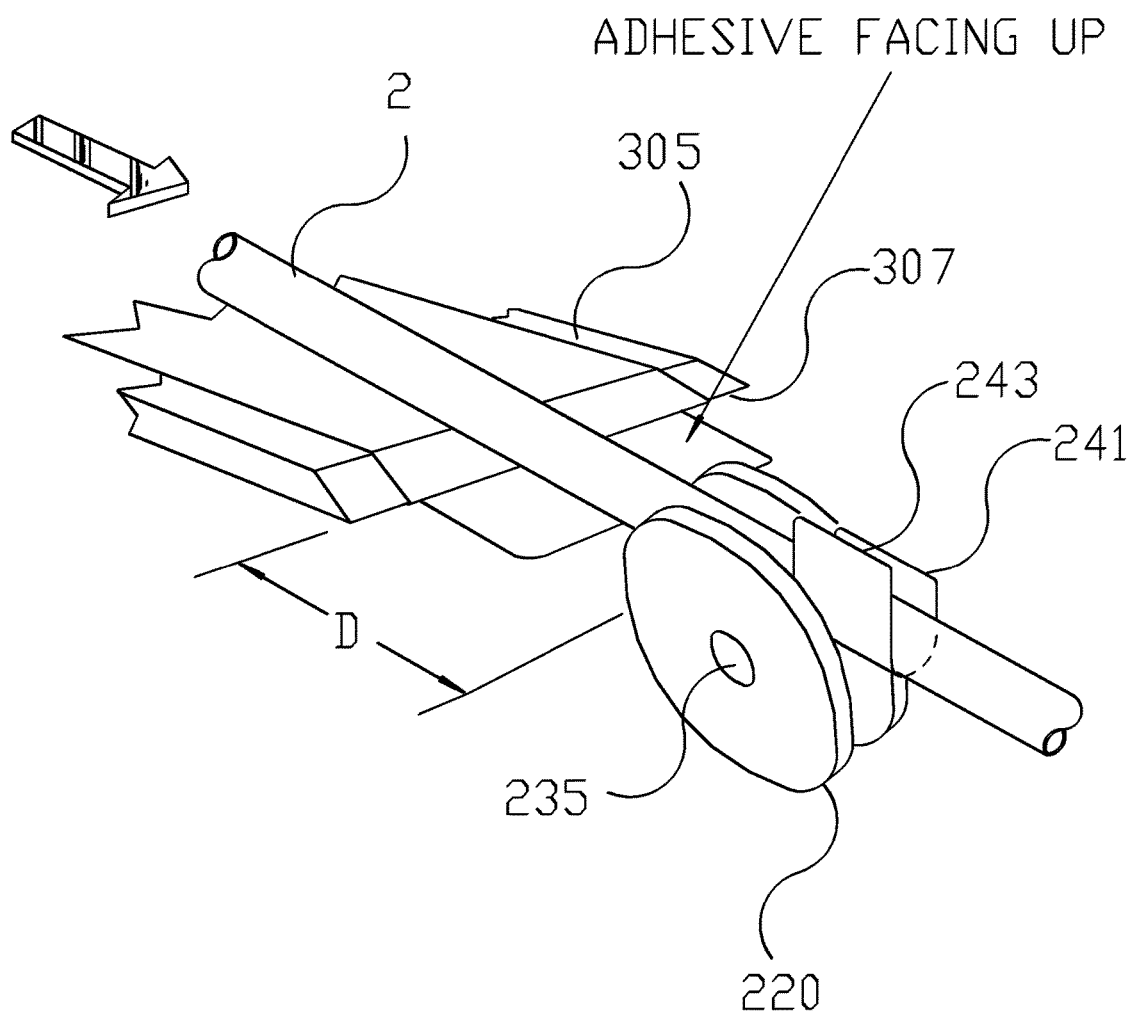
FIG. 5 is a diagram of a bottom push up roller and a peel blade in accordance with one embodiment of the invention.
Figure 6:
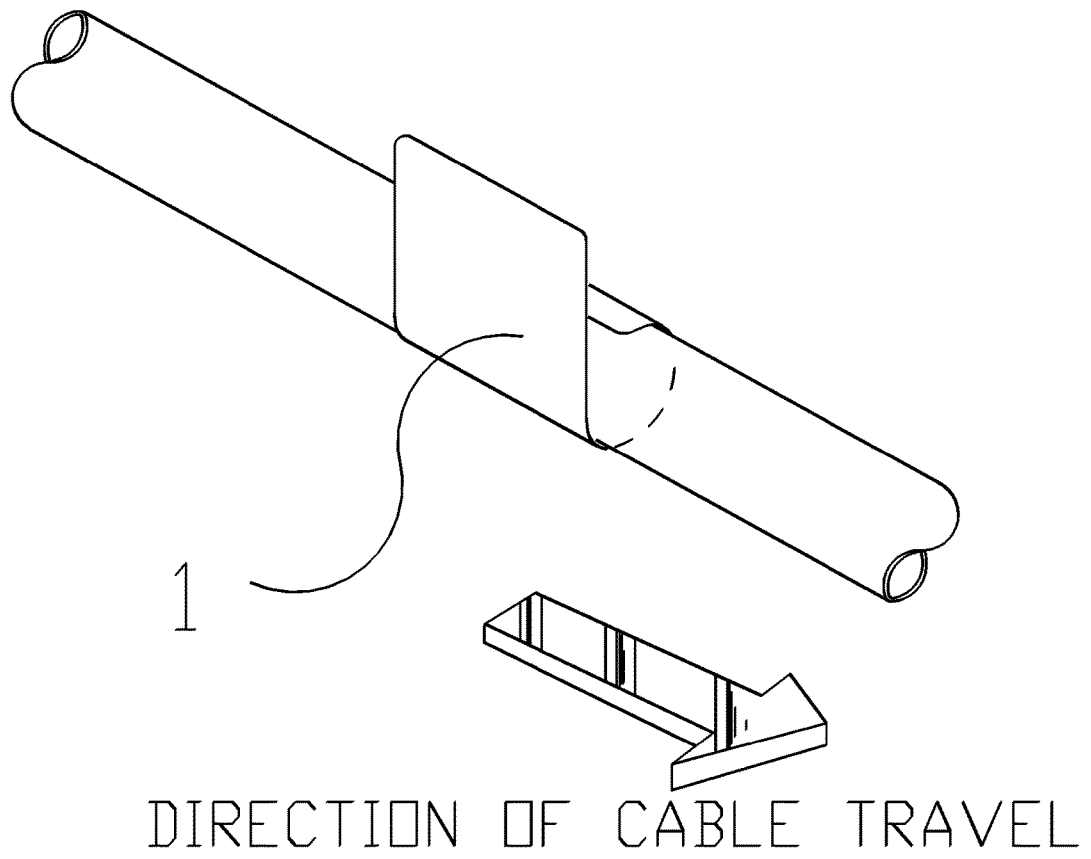
FIG. 6 is a diagram of a label after being operated on by a first roll down roller in accordance with one embodiment of the invention.

FIGS. 3-10A depict one disclosed embodiment of an apparatus for affixing one or more labels to a cable moving in line with the cable's axis. The labels 1 have front and back sides and a perimeter. Referring to FIG. 3, the apparatus includes a label dispenser having a speed of dispensing labels that is adjustable and synchronized with the linear speed of the moving cable 2. A bottom push up roller 220 is separated by a distance D from an edge 307 of a peel blade 305 of the dispenser. The distance D is determined based on the stiffness of a label as it detaches from its backing strip. The distance D will necessarily be less than the length of a label 1. The labels 1 dispense with the adhesive side facing up as shown in FIG. 5. In one disclosed implementation, the dispenser and the peel blade 305 are positioned to dispense and peel labels 1 in the same direction as the motion of the cable 2 moving along its axis.

In one disclosed embodiment, the cable 2 may be positioned to move over the peel blade 305 at a point 309 along the edge 307 so that the label forms an unequal U shape around the cable when received by the bottom push up roller 220. Referring to FIG. 4A and FIGS. 5-11, depending on the point 309 where the cable 2 moves over the labels 1 moving off the peel blade is positioned, the disparity 242 in height of the sides 241, 243 of the label as it is formed into a U shape may be adjusted. For example, if the cable 2 is centered on the labels 1, the sides 241, 243 of the sides of the U shape label will be equal in height. As the cable is positioned further from a center line of the labels 1, the more unequal the heights of the sides 241, 243 will be when folded up into the U shape.

Figure 12:
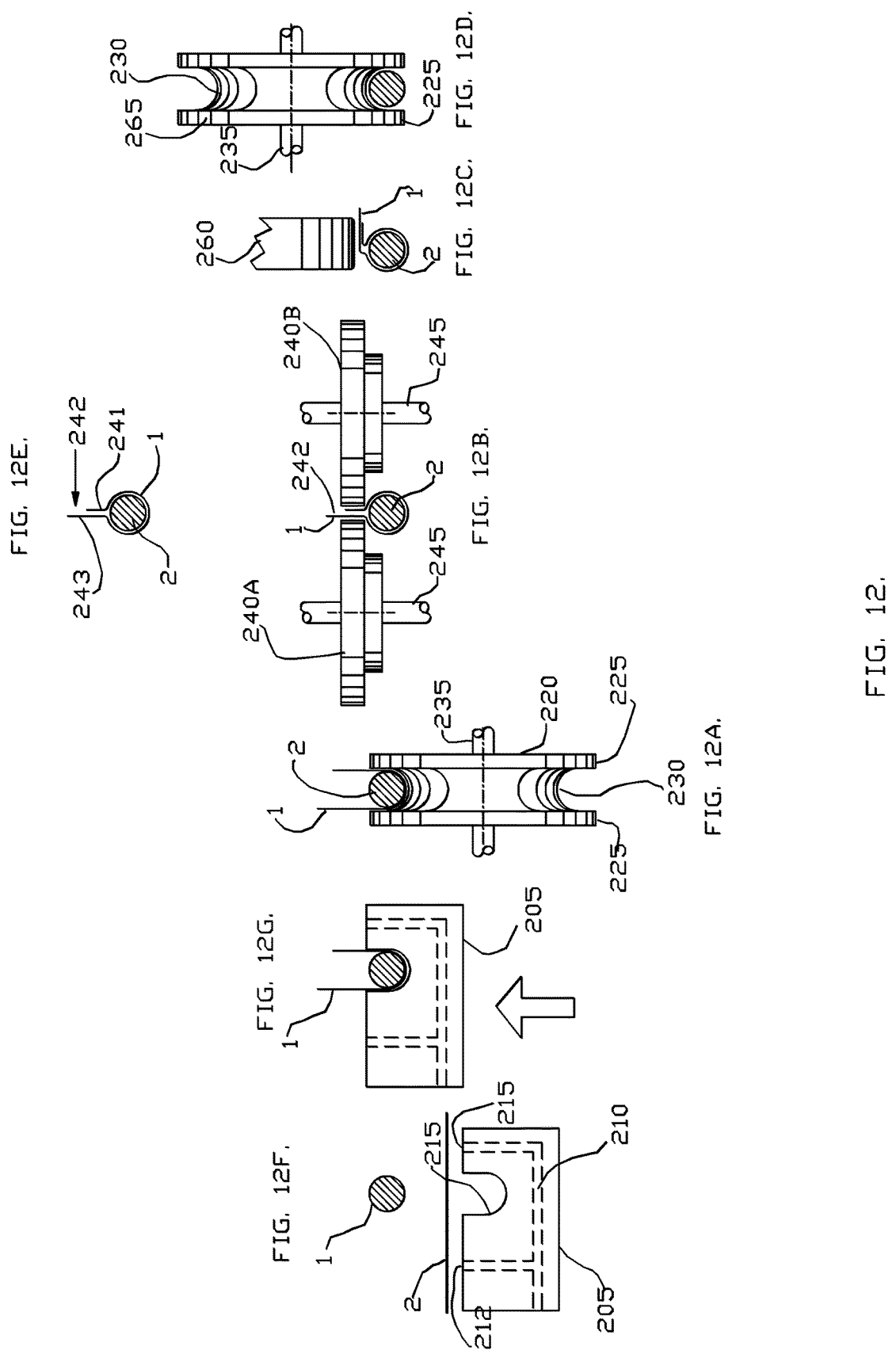
FIG. 12 is an operational flow diagram of an embodiment of an apparatus for affixing labels to a moving cable in accordance with one embodiment of the invention.

Referring to FIGS. 5 and 12, the bottom push up roller 220 has a channel 230 configured for receiving a cable 2 to be labeled, and the channel 230 is bounded by side walls 225. The roller 220 is configured for folding a label into a U shape around the cable 2 as the cable 2 and label 1 enter the roller 220. The roller 220 is rotatable about its axis 235 and the axis 235 is perpendicular to the direction of travel of the cable 2. The bottom push up roller 220 is disposed below the moving cable 2 so the cable 2 moves between the side walls 225. The side walls may assist in affixing the adhesive backed label 1 to the cable 2.

Figure 7:
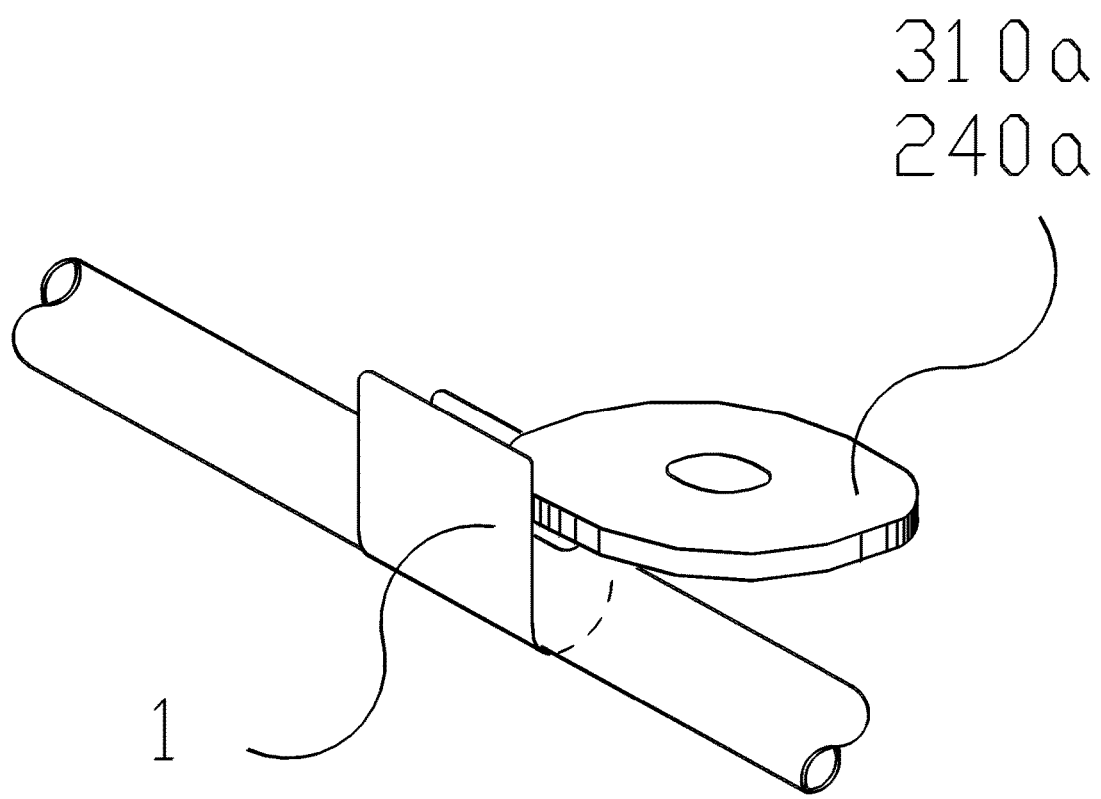
FIG. 7 is a diagram of a first roll down roller in operation in accordance with one embodiment of the invention.
Figure 8:
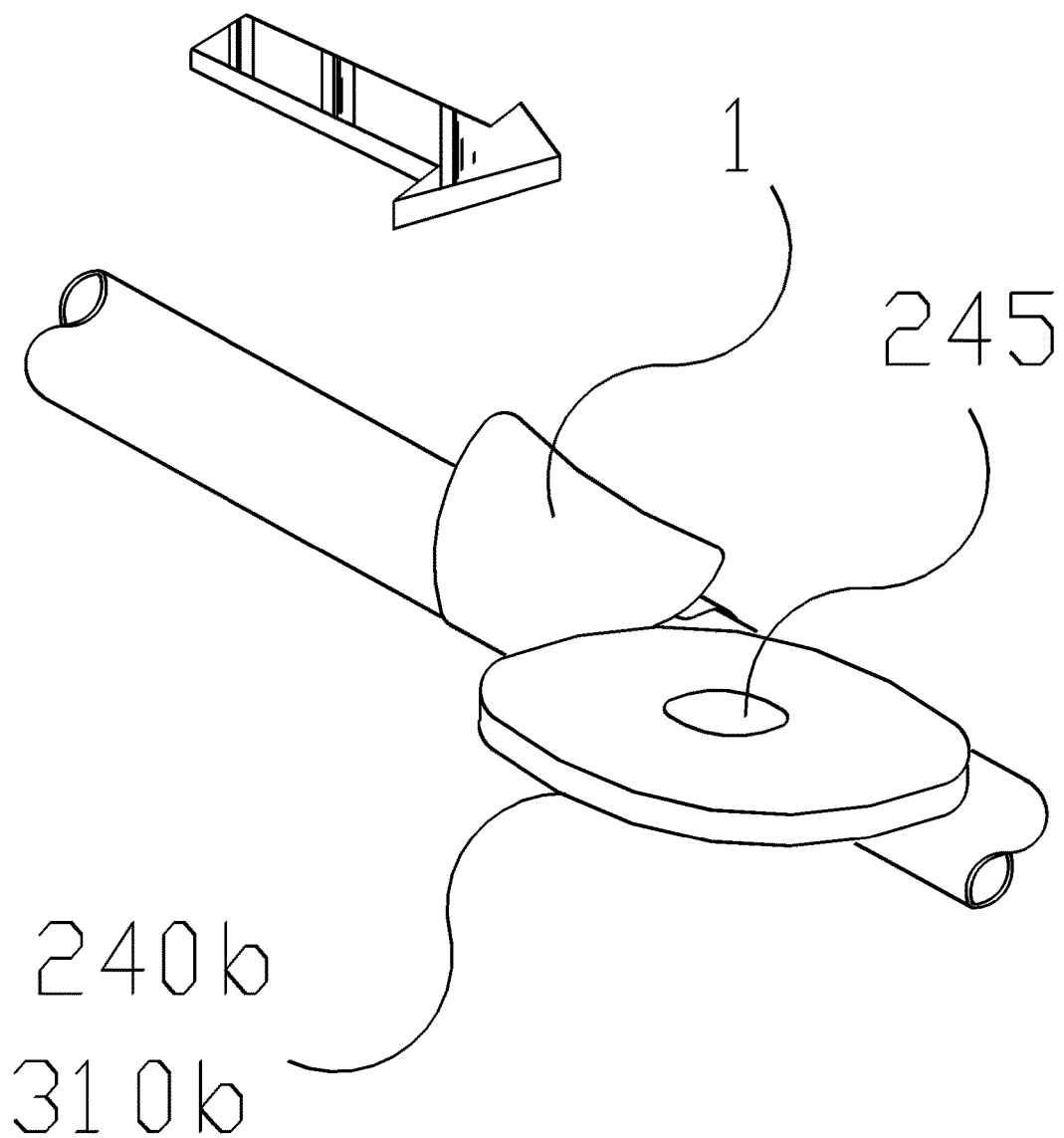
FIG. 8 is a diagram of a second roll down roller in an initial stage of operation in accordance with one embodiment of the invention.
Figure 9:
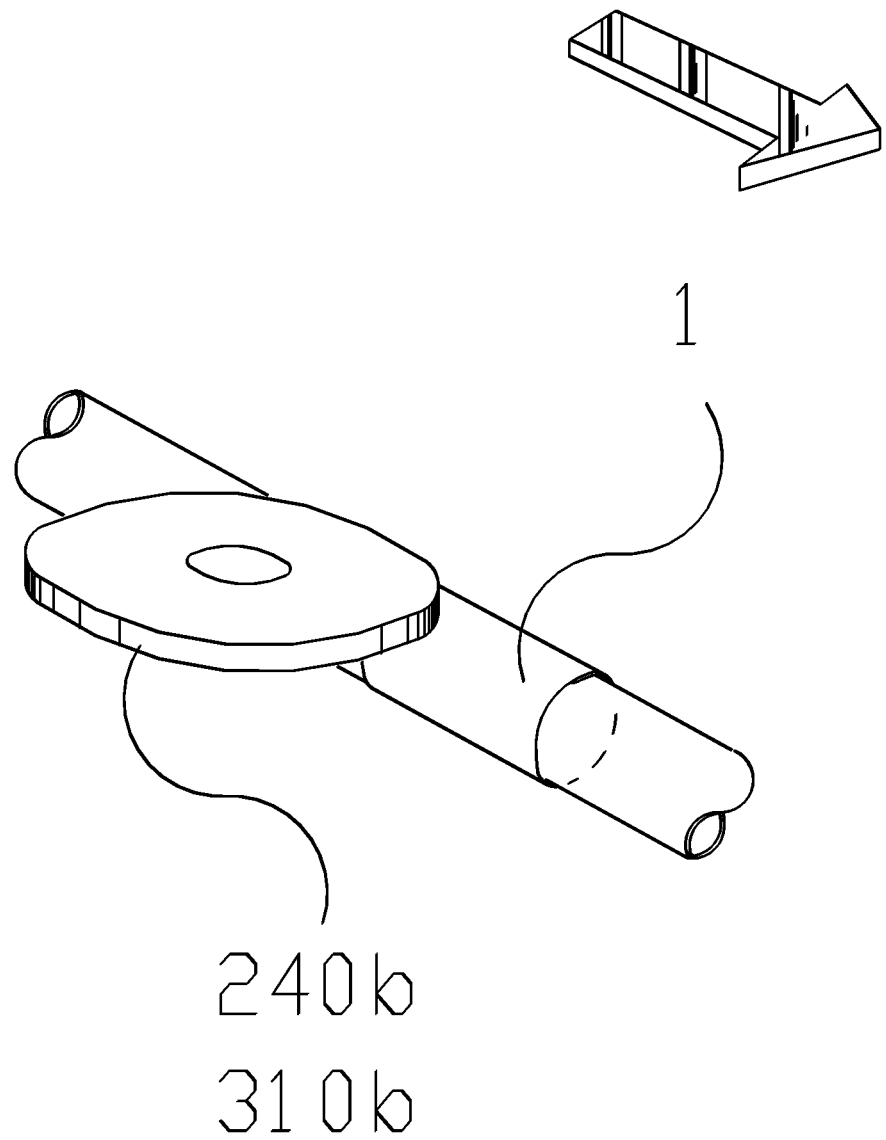
FIG. 9 is a diagram of a second roll down roller in a subsequent stage of operation in accordance with one embodiment of the invention.

Referring to FIGS. 7-9, downstream of the bottom push up roller 220 is a first roll down roller 310A. The first roll down roller 310A is disposed lateral to a first side 2A of the moving cable 2 and has a channel 230 bounded by side walls 225 and is configured to receive a moving cable 2 having a label 1 partially folded over therewith into a U shape by the bottom push up roller 220. The first roll down roller 310A is configured to fold down a shorter side 241 of the label 1 onto the moving cable 2.

In another disclosed embodiment, the roll down rollers 310A, 310B may only have one side wall for folding down the sides of the U shaped label on the cable 2.

Referring to FIGS. 8 and 9, further downstream is a second roll down roller 310B disposed lateral to a second side of the cable, opposite to the first side, and has a channel 230 bounded by side walls 225. The second roll down roller 310B is configured to receive a moving cable 2 having one shorter side 241 of the label folded down onto the cable 2 by the first roll down roller 310A. The second roll down roller 310B is configured to fold down a longer side 243 of the label 1 onto the moving cable 2 and over the shorter folded down side, with part of the adhesive side of the label 1 affixing to the top of the shorter folded down side.

Figure 10:
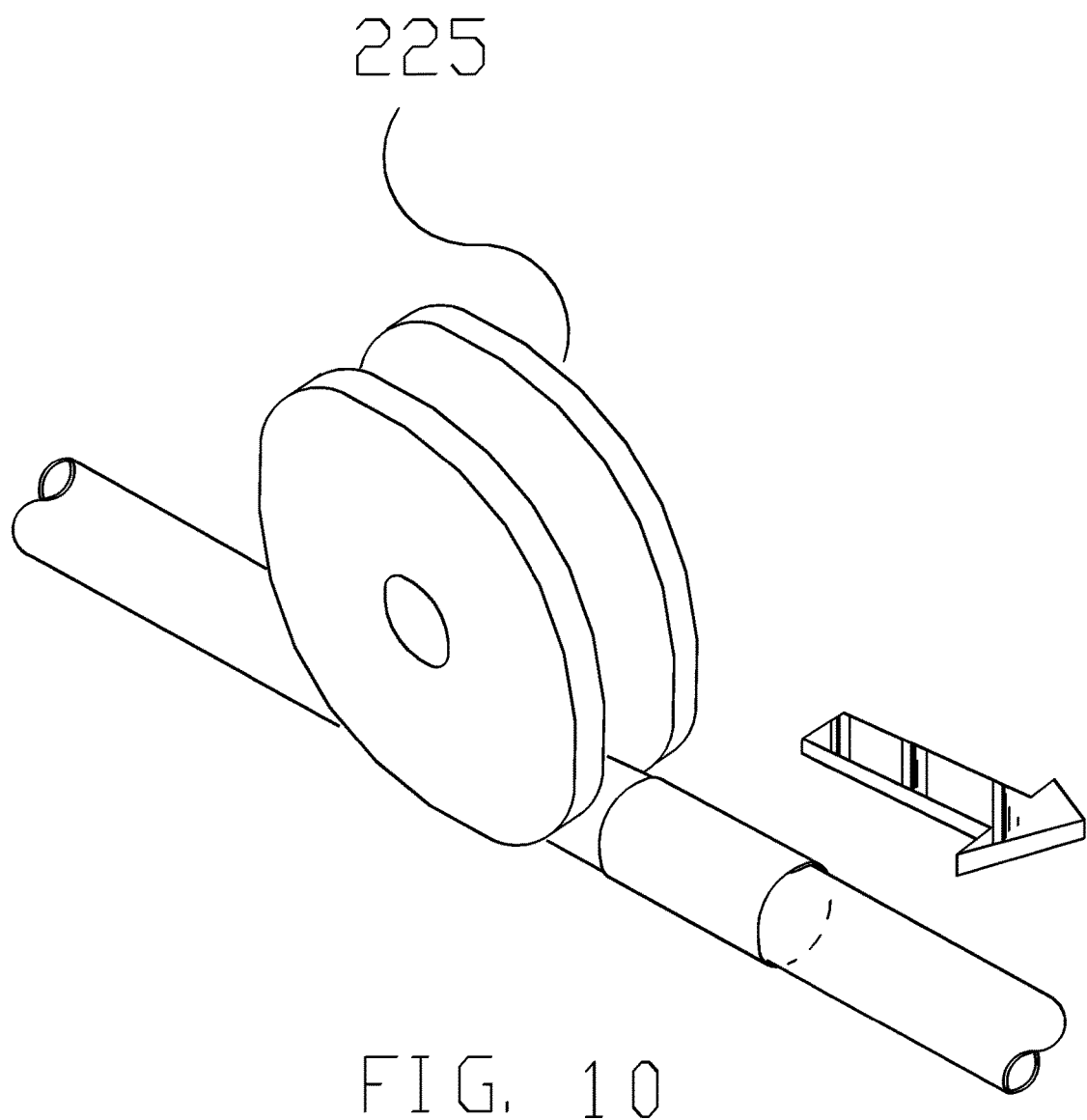
FIG. 10 is a diagram of a top push down roller in operation in accordance with one embodiment of the invention.
Figure 11:
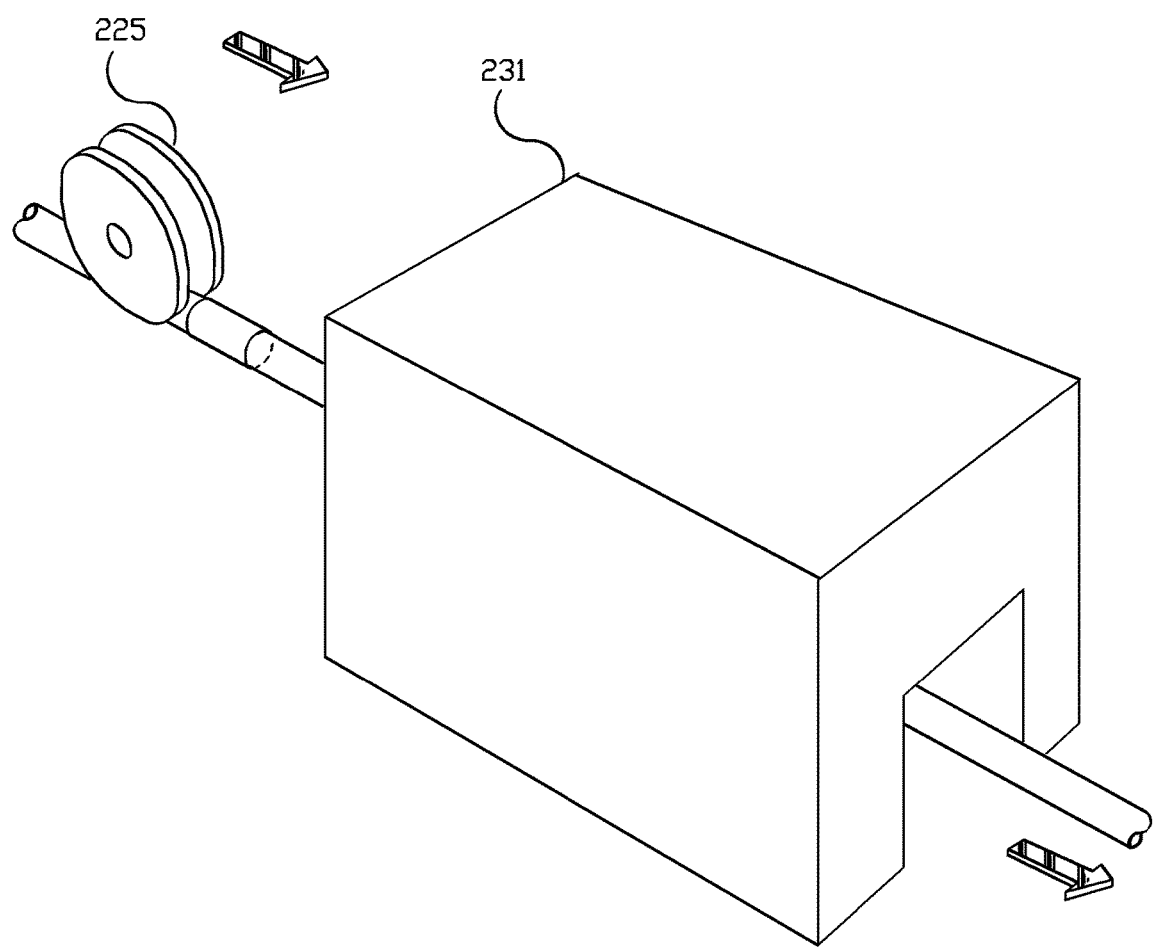
FIG. 11 is a diagram of a heat tunnel component of the apparatus for affixing labels to a moving cable in accordance with one embodiment of the invention.

Referring to FIGS. 10 and 11, downstream of the roll down rollers 310A, 310B is a top push down roller 265. In one disclosed embodiment, the top push down roller 265 is solid with no channel and presses the label 1 against the cable 2 to secure attachment. In another embodiment, the top push down roller may be of similar shape to the bottom push up roller 220 and include a channel and side walls for receiving the cable 2.

In another disclosed embodiment, illustrated in FIG. 11, a heat tunnel 231 may be provided downstream of the rollers. After the label 1 is affixed, the labeled cable 2 may be treated with hot air or radiant heat to cause the label 1 to shrink, preferably circumferentially. The heat tunnel and all the other components of the apparatus for affixing labels 1 to the cable 2 may be configured to rise out of the way when a scrambled or broken cable 2 approaches the apparatus.

In operation, an unlabeled cable 2 moves in a direction in line with its axis as indicated by the thick arrows in the figures. A label dispenser dispenses labels 1 adhered to a backing strip. As the backing strip moves over a peel blade, a label 1 detaches from the backing strip and is caught by the bottom push up roller 220 and is wedged between the cable and the roller 220. As the roller rotates, the label 1 is folded upward over the sides of the cable 2 so that two sides of the label are upright in a U shape. Next, the folded label 1 moves with the cable 2 into the first roll down roller and one side of the label is folded down. Subsequently, the cable 2 with the label 1 having one side folded down enters the second roll down roller 310B and a side wall pushes down the other side of the label 1. Subsequently, the labeled cable 2 is moved under the top push down roller to further press the label against the cable 2.

Figure 13:
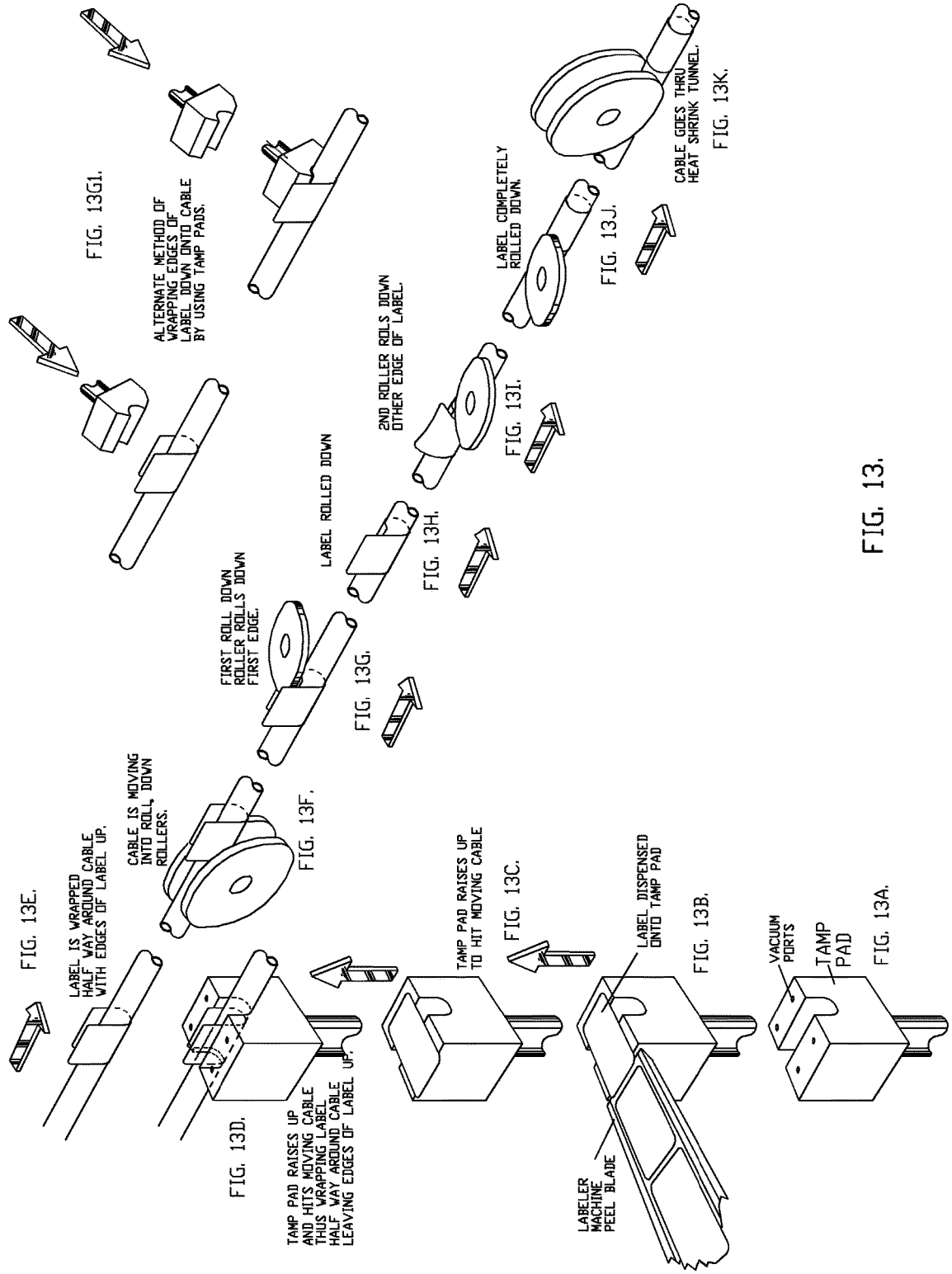
FIG. 13 is a diagram of an operational flow of one disclosed embodiment of an apparatus for affixing labels to a moving cable.
Figure 14:
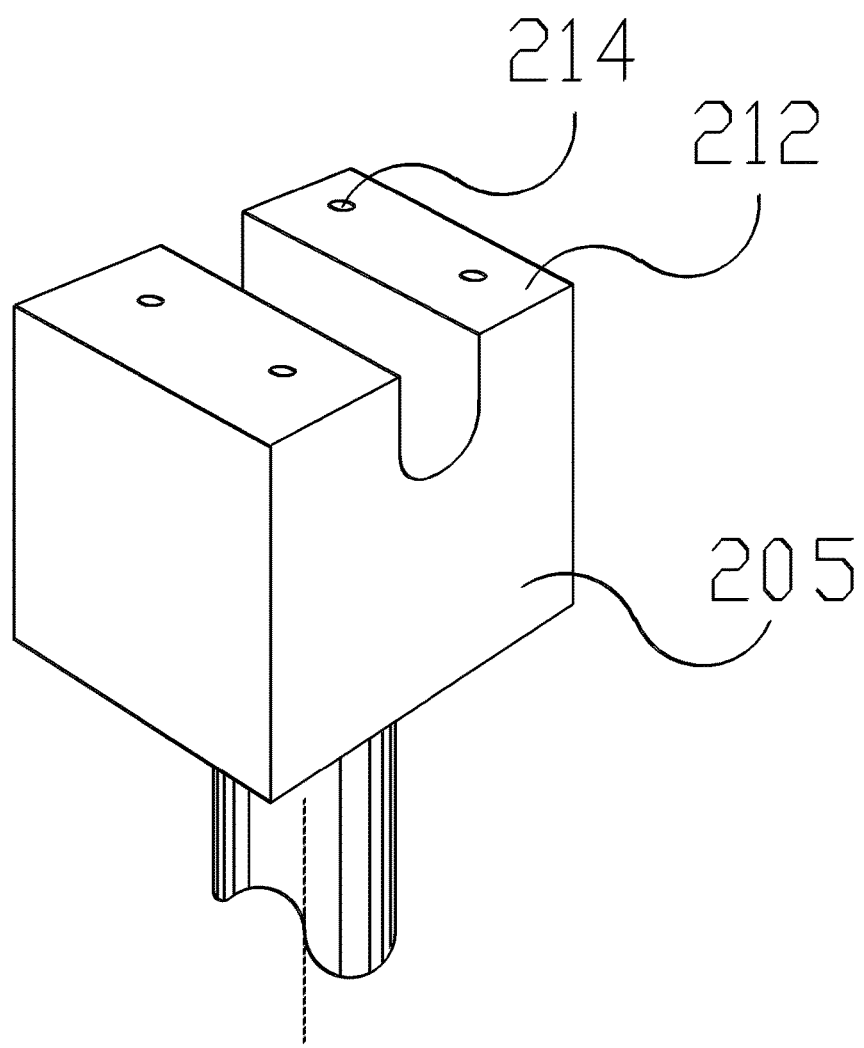
FIG. 14 is a diagram of a perspective view of a tamp pad having vacuum ports in accordance with one embodiment of the invention.

In another disclosed embodiment, shown in FIG. 13 and FIG. 13A through FIG. 13J, the dispenser and peel blade 305 is oriented to dispense labels 1 perpendicular to the direction of motion of a cable 2 moving along its axis. Referring to FIG. 14, a tamp pad 205 is provided having a U shaped channel 215 disposed in a flat top side 212 of the tamp pad 205. Vacuum ports 214 are disposed on the top side 212 to receive labels having an adhesive side facing up dispensed from the peel blade 305. The tamp pad having received a label 1, moves upward to engage a moving cable 2 into the channel 215, thus folding the label 1 into a U shape in the channel between the tamp pad 205 and the moving cable 2 as depicted in FIGS. 13B through 13D. Depending on the distance between the tamp pad 205 and the peel blade 307, the sides of the label 1 folded in to a U shape will be of differing heights.

Since the cable 2 is moving, the label 1 has traveled off of the tamp pad 205 and the grooved tamp pad returns to a lowered position away from the moving cable 2 and another adhesive backed label 1 may be dispensed onto the tamp pad 205. Vacuum holes 214 in the grooved tamp pad in the flat area of the grooved tamp pad are commencing with a vacuum condition to hold the label 1 in place for a specified period of time until the grooved tamp pad is pressed against the moving cable 2 and another U shaped attachment configuration cycle is repeated.

The labeled cable may then move into a bottom push up roller 220 for further securing the label to the cable. Next, the folded label moves with the cable into the first roll down roller and the shorter side of the label is folded down. Subsequently, the cable with the label having the shorter side folded down enters the second roll down roller 310B and a side wall pushes down the other taller side of the label. Subsequently, the labeled cable is moved under the top push down roller to further press the label against the cable.

In yet another disclosed embodiment, as shown in FIG. 13G1, a second tamp having a channel configured to press down a shorter side of a U shaped label 1 is disclosed. Downstream, a third tamp pad may press down the other taller side of the label 1. The second and third tamp pads may be used in place of the roll down rollers 310A, 310B, but otherwise, the components in the above described embodiments may remain the same.

A heat tunnel with a specified opening and a specified length and a specified wattage for heat generation encompasses the moving labeled cable 2 downstream of the rollers. When the When the moving labeled cable 2 enters the heat tunnel, the heat is controlled specifically for shrinking the label 1 in a specified way without damaging the text on the label 1. Independent of how large and bold any text displayed on the label 1 is, the label 1 will not absorb too much heat to damage the label 1. The heat is controllable for different sizes of labeled cable 2.

A release system with a specified range of opening causes the labeling and wrapping mechanisms to part or move away from the moving cable 2. This is to eliminate damage to the labeling and wrapping mechanisms when damaged, frayed, stringy, etc. sections of cable arrive at the labeling wrapping mechanism.

Although the invention has been shown and described with respect to certain embodiments, it is obvious that equivalent alterations and modifications will occur to others skilled in the art upon the reading and understanding of this specification and the annexed drawings. In addition, while a particular feature of the invention may have been disclosed with respect to only one of several embodiments, such feature may be combined with one or more other features of the other embodiments as may be desired. It is therefore, contemplated that the claims will cover any such modifications or embodiments that fall within the true scope of the invention.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one", "one or more" or the like; and adjectives such as "conventional", "traditional", "normal", "standard", "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more", "at least", "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for applying a label to an electrical cable having an outermost sheath with convolutions defining alternating peaks and valleys, the method comprising:
   providing a moving electrical cable having an outermost sheath;
   attaching the label to the sheath of the moving cable;
   wherein the label comprises a label substrate, the label substrate comprises an attaching side, the attaching side being attached through an adhesive; and
   wherein the label attaches to the peaks and spans across the valleys and circumferentially wraps around the sheath.

2. The method of claim 1, wherein the label has a thickness of at least 1.5 mil.

3. The method of claim 1, wherein the label has a thickness less than 2.0 mil.

4. The method of claim 1, wherein the label is electrically conductive.

5. The method of claim 1 further comprising attaching multiple ones of the label at selected intervals along the length of sheath.

6. The method of claim 1, wherein the selected intervals are predetermined.

7. The method of claim 6, wherein the predetermined intervals are the same interval.

8. The method of claim 1, wherein the label is color-coded to a color scheme.

9. The method of claim 8, wherein the color scheme is the American Wire Gauge (AWG) standard color scheme.

10. The method of claim 1, wherein a portion of the label is of heat shrinkable polymer material.

11. The method of claim 10, wherein the label substrate is comprised of a polyolefin.

12. The method of claim 1, wherein the label is in tight shrinked engagement with the sheath.

13. The method of claim 1, wherein the label attaches to at least two peaks and spans at least one valley of the sheath.

14. The method of claim 1, wherein opposite ends of the label circumferentially wrapped around the sheath overlap one another.

15. The method of claim 1, wherein the label comprises an indicia side opposite the attaching side and wherein a first indicia is provided on the indicia side of the label.

16. The method of claim 15 further comprising attaching a second label to the sheath, wherein the second label comprises an attaching side and an indicia side and wherein a second indicia is provided on the indicia side of the label.

17. The method of claim 16, wherein the second indicia is different from the first indicia.

18. The method of claim 16, wherein the second indicia includes alpha numeric characters.

19. The method of claim 16, wherein the label and second label have predetermined shapes and sizes.

20. The method of claim 19, wherein the predetermined shapes and sizes of the label are different from the predetermined shapes and sizes of the second label.

* * * * *